Patented June 7, 1932

1,862,439

UNITED STATES PATENT OFFICE

FRITZ STRAUB AND WALTER ANDERAU, OF BASEL, SWITZERLAND, ASSIGNORS TO FIRM "SOCIETY OF CHEMICAL INDUSTRY IN BASLE," OF BASEL, SWITZERLAND

METALLIFEROUS DYESTUFFS AND PROCESS OF MAKING SAME

No Drawing. Application filed May 22, 1930, Serial No. 454,829, and in Switzerland May 25, 1929.

The present invention relates to the production of new metalliferous dyestuffs. It comprises the process of making these dyestuffs, the dyestuffs themselves, and the material that has been dyed with the new dyestuffs.

This invention relates to the manufacture of metalliferous dyestuffs by treating an azo-dyestuff of the general formula

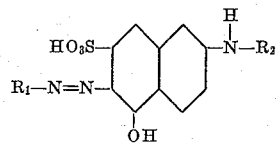

in which $R_1$ mean an aryl nucleus containing a lake-forming group in the o-position to the azo bridge and $R_2$ means an alkyl-, aralkyl- or aryl-radicle, in either order with a nitrosating agent and one or more agents yielding metal capable of forming a complex metal compound with the lake-forming group of the azo-dyestuff. As such metals those are to be named the atomic weights of which range between 52 and 64, such as chromium, manganese, iron, cobalt, nickel and copper, of which particularly chromium and copper are suitable.

The new metalliferous dyestuffs thus obtained are useful for dyeing animal and vegetable fibres, particularly artificial fibres derived from so-called regenerated cellulose.

The new products can also be produced in the dye-bath or on the fibre.

The following examples illustrate the invention, the parts being by weight:—

Example 1

60 parts of the chromium compound of the dyestuff from diazotized 5-nitro-2-amino-1-phenol and 2-phenylamino-5-hydroxy-naphthalene-7-sulfonic acid are dissolved hot in 3000 parts of water and the solution is made alkaline with 4 parts of sodium hydroxide. 8 parts of sodium nitrite are then dissolved in the solution and the latter is cooled with ice to 4–6° C. In the course of some hours there are added 120 parts of sulfuric acid of 10 per cent. strength, care being taken that during this time the temperature does not exceed 10° C. When the acidification is complete neutralization with sodium carbonate follows and the new dyestuff is salted out with common salt and dried. It is a dark powder, which dissolves in water and dilute alkalies to a grey-blue solution and in concentrated sulfuric acid to a violet solution. In a neutral or alkaline Glauber's salt bath cotton and artificial silk are dyed by the dyestuff good level steel-blue tints, and like tints on animal fibre are produced in an acid bath.

In this example a 2-tolylamino-5-hydroxy-naphthalene-7-sulfonic acid or another product substituted in the benzene nucleus, or a N-alkyl- or N-aralkyl-derivative of the 2-amino-5-hydroxynaphthalene-7-sulfonic acid may be substituted for the 2-phenylamino-5-hydroxynaphthalene-7-sulfonic acid.

Example 2

40 parts of the dyestuff from diazotized 5-nitro-2-amino-1-phenol and 2-phenylamino-5-hydroxynaphthalene-7-sulfonic acid are dissolved in 3000 parts of water. After addition of 8 parts of sodium nitrite the solution is acidified at 4–10° C. and in the course of some hours by means of 105 parts of sulfuric acid of 10 per cent. strength, and then the dyestuff is precipitated by means of common salt and filtered. When dry it is a bronze powder, soluble in water to a violet solution, in dilute alkalies to a blue solution and in concentrated sulfuric acid to a violet solution. It dyes cotton in an alkaline bath blue tints, which become fast blue-violet when coppered.

The nitrosated dyestuff thus obtained can be converted in known manner by boiling for several hours with a chromic salt into the chromium compound. This latter has the same chemical and dyeing properties as those of the compound obtained by nitrosating the chromium compound according to Example 1.

Example 3

The nitrosated dyestuff obtained as described in paragraph 1 of the Example 2 is converted in known manner by means of copper sulfate or cupric ammonium sulfate into the copper compound. The latter is a bronze powder, soluble in water to a violet solution, in dilute alkalies to a blue-violet solution and in concentrated sulfuric acid to a violet solution. It dyes vegetable fibres in an alkaline bath containing Glauber's salt blue-violet tints.

Products yielding similar or more bluish tints are obtained if the copper is replaced by nickel or cobalt, respectively, whilst the manganese or iron containing dyestuffs give on the fiber more brownish tinged shades.

*Example 4*

The quantity of the chromium compound of the disazo-dyestuff from diazotized 4-nitro-2-amino-1-phenol-6-sulfonic acid and 5:5'-dihydroxy-2:2'-dinaphthylamine-7:7'-disulfonic acid, which corresponds with 14 parts of sodium nitrite, is dissolved in 2500 parts of water and neutralized with caustic soda solution. To this solution 8 parts of sodium nitrite are added. The whole is then acidified at 5–10° C. and in the course of several hours, by means of about 100 parts of sulfuric acid of 10 per cent. strength, then neutralized with sodium carbonate and concentrated and mixed with salt to separate the new dyestuff. When the latter is dry it is a dark powder, soluble in water, concentrated sulfuric acid and dilute alkalies to a red-blue solution. It dyes cotton and artificial silk in a neutral Glauber's salt bath quite level grey-blue tints.

*Example 5*

The quantity of the copper compound of the disazo-dyestuff from diazotized 2-amino-1-phenol-4-sulfamide and 5:5'-dihydroxy-2:2'-dinaphthylamine-7:7'-disulfonic acid, which corresponds with 14 parts of sodium nitrite, is dissolved in 4000 parts of water and the solution is neutralized with caustic soda solution. There are then added 7.6 parts of sodium nitrite and in the course of some hours at a temperature of 5–10° C. enough sulfuric acid of 10 per cent. strength to render the reaction permanently acid with mineral acid. After neutralization and concentration the dyestuff is separated by salting out and dried. It is a bronze powder, soluble in water and dilute alkalies to a red-violet solution and in concentrated sulfuric acid to a blue solution. Vegetable fibre and artificial silk are dyed in a neutral or alkaline Glauber's salt bath red-violet tints by this dyestuff.

*Example 6*

60 parts of the mixed metal compound obtainable by treating 55 parts of the orthohydroxyazo-dyestuff from 5-nitro-2-amino-1-phenol and 2-phenylamino-5-hydroxy-naphthalene-7-sulfonic acid with 8.5 parts of crystallized copper sulfate and 15 parts of $Cr_2O_3$ in the form of a solution of chromium fluoride are dissolved in 3000 parts of water. The feebly alkaline solution is mixed with 7–8 parts of sodium nitrite and in the course of some hours at 4–6° C. with sulfuric acid of 10 per cent. strength, until the reaction is acid with mineral acid. Neutralization with sodium carbonate and salting out follow, whereby the new dyestuff is separated. It is a dark powder, soluble in water and dilute alkalies to a blue solution and in concentrated sulfuric acid to a violet solution. It dyes vegetable fibres and artificial silk in a neutral or alkaline Glauber's salt bath level blue tints.

*Example 7*

For dyeing 100 parts of cotton about 1–3 parts of dry dyestuff are dissolved in the quantity of water necessary for dyeing, the wetted cotton is entered at 30–40° C. and the bath is heated in the course of ½ hour to boiling after addition of 30–40 parts of Glauber's salt. The bath is then allowed to cool to 75° C. and is kept at this temperature for about ½–¾ hour. Rinsing and drying follow.

The goods may also be dyed in a dye-bath feebly alkaline with sodium carbonate or soap, or feebly acid with acetic acid.

*Example 8*

100 parts of viscose goods are entered into a dye-bath at 20° C. wherein 1–3 parts of a dry dyestuff are dissolved. In the course of ½ hour the temperature is raised to 75–80° C. and 30–40 parts of Glauber's salt are added, and dyeing is continued for ¾ hour at the same temperature. Rinsing and drying follow.

*Example 9*

For 100 parts of ordinary or weighted silk, 2–3 parts of dried dyestuff are dissolved in the necessary quantity of water. To this solution are added 5–8 parts of acetic acid, the goods are entered at 50–60° C. and the bath is heated gradually to 80° C. and kept at this temperature for ¾ to 1 hour. The goods are washed, brightened in the usual way and dried. The silk is dyed a fast tint.

What we claim is:—

1. A process for the manufacture of new metalliferous azodyestuffs consisting in treating the azo-dyestuffs of the general formula

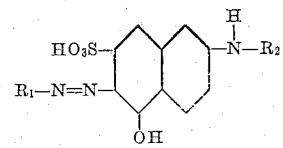

wherein $R_1$ means a benzene nucleus containing a lake-forming group in the o-position to the azo bridge and $R_2$ means an alkyl-, benzyl, phenyl or naphthyl radicle, with agents that yield metals capable of forming complex compounds with the lake-forming group of the azo-dyestuff, and with a nitrosating agent.

2. A process for the manufacture of new metalliferous azo-dyestuffs consisting in first treating the azo-dyestuffs of the general formula

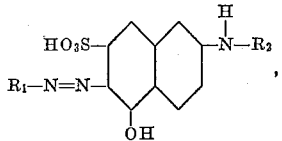

wherein $R_1$ means a benzene nucleus containing a lake-forming group in the o-position to the azo bridge and $R_2$ means an alkyl-, benzyl, phenyl or naphthyl radicle, with agents that yield metals the atomic weights of which metals lie between 52 and 64 and then with a nitrosating agent.

3. A process for the manufacture of new metalliferous azo-dyestuffs consisting in first treating the azo-dyestuffs of the general formula

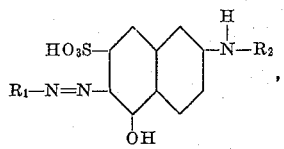

wherein $R_1$ means a benzene nucleus containing a hydroxy group in the o-position to the azo bridge and $R_2$ means a benzyl, phenyl or naphthyl radicle, with agents that yield metals the atomic weights of which metals lie between 52 and 64 and then with a nitrosating agent.

4. A process for the manufacture of new azo-dyestuffs containing chromium consisting in first treating the azo-dyestuffs of the general formula

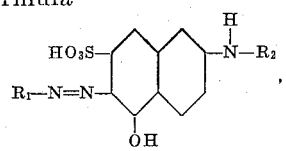

wherein $R_1$ means a benzene nucleus containing a hydroxy group in the o-position to the azo-bridge and $R_2$ means a benzene or naphthalene nucleus, with agents that yield chromium and then with a nitrosating agent.

5. A process for the manufacture of new azo-dyestuffs containing chromium consisting in first treating the azo-dyestuffs of the general formula

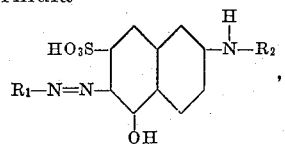

wherein $R_1$ means a benzene nucleus containing a hydroxy group in the o-position to the azo bridge and $R_2$ means a phenyl-nucleus, with agents that yield chromium and then with a nitrosating agent.

6. A process for the manufacture of a new azo-dyestuff containing chromium consisting in first treating the azo-dyestuff of the formula

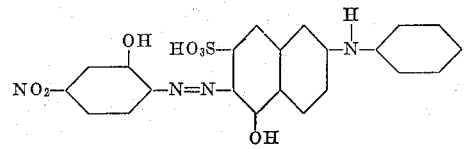

with a salt of trivalent chromium and then with a nitrosating agent.

7. As new products the metalliferous azo-dyestuffs made by treating the azo-dyestuffs of the general formula

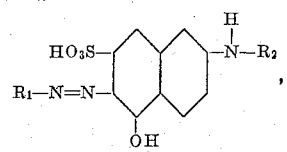

wherein $R_1$ means a benzene nucleus containing a lake-forming group in the o-position to the azo bridge and $R_2$ means an alkyl-, benzyl, phenyl or naphthyl radicle, with agents that yield metals capable of forming complex compounds with the lake-forming group of the azo-dyestuff, and with a nitrosating agent, which products form dark powders, soluble in water and dilute alkalies to grey-blue, blue, blue-violet, red-blue and red-violet solutions and which dye the vegetable fibres and artificial silk blue, steel-blue, blue-violet, grey-blue and red-violet tints.

8. As new products the metalliferous azo-dyestuffs made by treating the azo-dyestuffs of the general formula

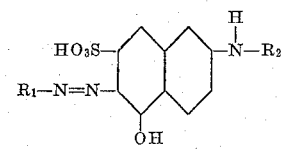

wherein $R_1$ means a benzene nucleus containing a lake-forming group in the o-position to the azo bridge and $R_2$ means an alkyl-, benzyl, phenyl or naphthyl radicle, with agents that yield metals the atomic weights of which metals lie between 52 and 64 and with a nitrosating agent, which products form dark powders, soluble in water and dilute alkalies to grey-blue, blue, blue-violet, red-blue and red-violet solutions and which dye the vegetable fibres and artificial silk blue, steel-blue, blue-violet, grey-blue and red-violet tints.

9. As new products the metalliferous azo-dyestuffs made by treating the azo-dyestuffs of the general formula

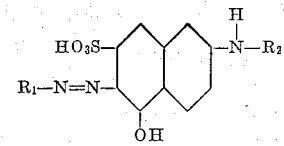

wherein $R_1$ means a benzene nucleus containing a hydroxy group in the o-position to the azo bridge and $R_2$ means a benzyl, phenyl or naphthyl radicle, with agents that yield metals the atomic weights of which metals lie between 52 and 64 and with a nitrosating agent, which products from dark powders, soluble in water and dilute alkalies to grey-blue, blue, blue-violet, red-blue and red-violet solutions and which dye the vegetable fibres and artificial silk blue, steel-blue, blue-violet, grey-blue and red-violet tints.

10. As new products the azo-dyestuffs containing chromium made by treating the azo-dyestuffs of the general formula

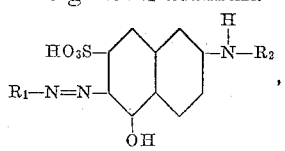

wherein $R_1$ means a benzene nucleus containing a hydroxy group in the o-position to the azo bridge and $R_2$ means a benzene or naphthalene nucleus, with agents that yield chromium and with a nitrosating agent, which products form dark powders, soluble in water and dilute alkalies to grey-blue, blue and blue-violet solutions and which dye the vegetable fibres and artificial silk blue, steel-blue and grey-blue tints.

11. As new products the azo-dyestuffs containing chromium made by treating the azo-dyestuffs of the general formula

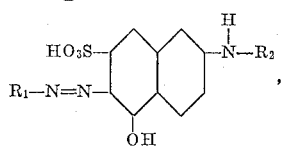

wherein $R_1$ means a benzene nucleus containing a hydroxy group in the o-position to the azo bridge and $R_2$ means a phenyl-nucleus, with agents that yield chromium and with a nitrosating agent, which products form dark powders, soluble in water and dilute alkalies to grey-blue and blue solutions and which dye the vegetable fibres and artificial silk blue and steel-blue tints.

12. As a new product the azo-dyestuff containing chromium made by treating the azo-dyestuff of the formula

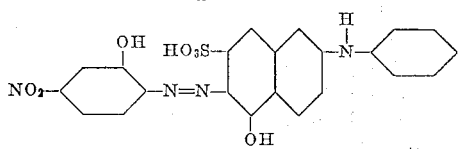

with a salt of trivalent chromium and with a nitrosating agent, which product forms a dark powder, soluble in water and dilute alkalies to a blue solution and which dyes vegetable fibres and artificial silk a steel-blue shade.

In witness whereof we have hereunto signed our names this 13th day of May, 1930.

FRITZ STRAUB.
WALTER ANDERAU.